(12) United States Patent
Kuczek et al.

(10) Patent No.: US 9,876,385 B2
(45) Date of Patent: Jan. 23, 2018

(54) SEAT WIRELESS CHARGER (71) Applicant: AMI INDUSTRIES, INC., Colorado Springs, CO (US)

(72) Inventors: Andrzej Ernest Kuczek, Bristol, CT (US); Brian St. Rock, Andover, CT (US)

(73) Assignee: AMI INDUSTRIES, INC., Colorado Springs, CO (US)

( * ) Notice: Subject to any disclaimer, the term of this patent is extended or adjusted under 35 U.S.C. 154(b) by 180 days.

(21) Appl. No.: 14/939,869

(22) Filed: Nov. 12, 2015

(65) Prior Publication Data
US 2017/0141600 A1   May 18, 2017

(51) Int. Cl.
H02J 7/00   (2006.01)
H02J 7/02   (2016.01)
H02J 7/14   (2006.01)

(52) U.S. Cl.
CPC ............... *H02J 7/025* (2013.01); *H02J 7/14* (2013.01)

(58) Field of Classification Search
USPC ........................................................ 320/108
See application file for complete search history.

(56) References Cited

U.S. PATENT DOCUMENTS

| | | |
|---|---|---|
| 5,959,433 A | 9/1999 | Rohde |
| 7,239,110 B2 | 7/2007 | Cheng et al. |
| 8,310,200 B2 | 11/2012 | Matouka et al. |
| 8,610,398 B2 | 12/2013 | Lee et al. |
| RE44,713 E | 1/2014 | Jung |
| 2010/0007805 A1* | 1/2010 | Vitito ................ B60K 35/00 348/837 |
| 2010/0013432 A1 | 1/2010 | Toya et al. |
| 2011/0156638 A1 | 6/2011 | Thorsell et al. |
| 2012/0146426 A1 | 6/2012 | Sabo |
| 2013/0038279 A1* | 2/2013 | Seyerle ............... B60R 16/033 320/108 |
| 2013/0207478 A1 | 8/2013 | Metcalf et al. |
| 2014/0053185 A1 | 2/2014 | Bleacher et al. |

(Continued)

FOREIGN PATENT DOCUMENTS

| | | |
|---|---|---|
| EP | 2866476 | 4/2015 |
| EP | 2884618 | 6/2015 |
| JP | 2001190029 | 7/2001 |

(Continued)

OTHER PUBLICATIONS

Extended European Search Report dated Apr. 10, 2017 in European Application No. 16198367.1.

*Primary Examiner* — Robert Grant
(74) *Attorney, Agent, or Firm* — Snell & Wilmer L.L.P.

(57) ABSTRACT

A seat control unit (SCU) for use in an aircraft can include a base that has a wireless charger configured to transmit a wireless power signal and a case at least partially enclosing the wireless charger. The SCU can also include a control device having a remote controller configured to wirelessly control a system of the aircraft and a battery coupled to the remote controller and configured to store electrical energy. The control device can also include a wireless receiver configured to receive the wireless power signal from the wireless charger and transmit associated power to the battery and an outer casing at least partially enclosing at least one of the remote controller or the wireless receiver.

19 Claims, 3 Drawing Sheets (56) References Cited

U.S. PATENT DOCUMENTS

2015/0042269 A1 2/2015 Koren et al.
2015/0263565 A1* 9/2015 Amano .................. H02J 7/025
　　　　　　　　　　　　　　　　　　　　　　　320/108

FOREIGN PATENT DOCUMENTS

WO 　2013055671 　4/2013
WO 　2013080068 　6/2013

* cited by examiner

SEAT WIRELESS CHARGER

FIELD

The present disclosure is directed to wireless charging and, more particularly, to wireless charging of controllers of seat control units of aircraft.

BACKGROUND

Many aircraft include passenger-controlled components such as a display for displaying video content and actuators for controlling a position of a passenger seat. Each passenger seat can include a seat control unit (SCU) that can be used to control this equipment. For example, the SCU can be used to control the operation of the display and/or the operation of the seat-position actuators. Some airlines utilize handheld SCUs that are detachable from the seat. SCUs can be wired (i.e., electronically coupled to the component via cables or wires) or can be wireless (i.e., wirelessly coupled to the component). The wired SCUs can receive power via the cable. However, wireless SCUs that are currently in use require a wired connection to receive power.

SUMMARY

Described herein is a seat control unit (SCU) for use in an aircraft. The SCU can include a base that has a wireless charger configured to transmit a wireless power signal and a case at least partially enclosing the wireless charger. The SCU can also include a control device having a remote controller configured to wirelessly control a system of the aircraft and a battery coupled to the remote controller and configured to store electrical energy. The control device can also include a wireless receiver configured to receive the wireless power signal from the wireless charger and transmit associated power to the battery and an outer casing at least partially enclosing at least one of the remote controller or the wireless receiver.

In any of the foregoing SCUs, the base further includes a back cover configured to be coupled to the aircraft and to the case such that the wireless charger can be positioned within a volume defined by the back cover and the case.

In any of the foregoing SCUs, the base further includes padding positioned between the wireless charger and the back cover and configured to compress in response to the back cover being coupled to the case.

In any of the foregoing SCUs, the base further includes a top cover coupled to the case for increasing aesthetic appeal of the base.

In any of the foregoing SCUs, the base further includes a retaining structure configured to resist movement of the control device relative to the base.

In any of the foregoing SCUs, the wireless charger further includes a charging feature configured to transmit the wireless power signal and the case further defines a recess that aligns with the charging feature when the base is assembled.

In any of the foregoing SCUs, the base further includes a first base magnet and the control device further includes a first remote magnet, the first base magnet and the first remote magnet being configured to attract to each other to resist movement of the control device relative to the base.

In any of the foregoing SCUs, the outer casing of the control device includes a top casing and a bottom casing coupled together.

In any of the foregoing SCUs, the bottom casing defines an opening configured to reduce the likelihood of interference of the wireless power signal when the control device is operatively coupled to the base.

Also described is a base for use in an aircraft. The base includes a wireless charger configured to transmit a wireless power signal. The base also includes a back cover configured to be coupled to the aircraft. The base also includes a case configured to be coupled to the back cover such that the back cover and the case define an opening in which the wireless charger can be positioned.

Any of the foregoing bases can also include padding positioned between the wireless charger and the back cover and configured to compress in response to the back cover being coupled to the case.

Any of the foregoing bases can also include a top cover coupled to the case for increasing aesthetic appeal of the base.

In any of the foregoing bases, the base is part of a seat control unit and wherein the seat control unit also includes a control device configured to wirelessly control a system of the aircraft.

Any of the foregoing bases can be configured to mate with the control device and the wireless charger is configured to transmit the wireless power signal to the control device in response to the base being mated with the control device.

Any of the foregoing bases can also include a retaining structure configured to resist movement of the control device relative to the base.

In any of the foregoing bases, the wireless power signal can be received by a personal device for powering the personal device.

Also described is a control device for use with an aircraft. The control device includes a remote controller configured to wirelessly control a system of the aircraft and a battery coupled to the remote controller and configured to store electrical energy. The control device also includes a wireless receiver configured to receive a wireless power signal and transmit associated power to the battery. The control device also includes an outer casing at least partially enclosing the remote controller and the wireless receiver.

In any of the foregoing control devices, the outer casing includes a top casing and a bottom casing coupled together and defining a volume in which the remote controller and the wireless receiver are positioned.

Any of the foregoing control devices can also include a first remote magnet coupled to the bottom casing, wherein the control device is configured to mate with and receive the wireless power signal from a base having a first base magnet, and wherein the first remote magnet and the first base magnet attract to reduce the likelihood of the control device separating from the base in response to the control device being mated with the base.

In any of the foregoing control devices, the bottom casing defines an opening configured to reduce the likelihood of interference of the wireless power signal when the control device is operatively coupled to the base The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

FIG. 1 is a drawing of a seat control unit for use in an aircraft, in accordance with various embodiments;

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
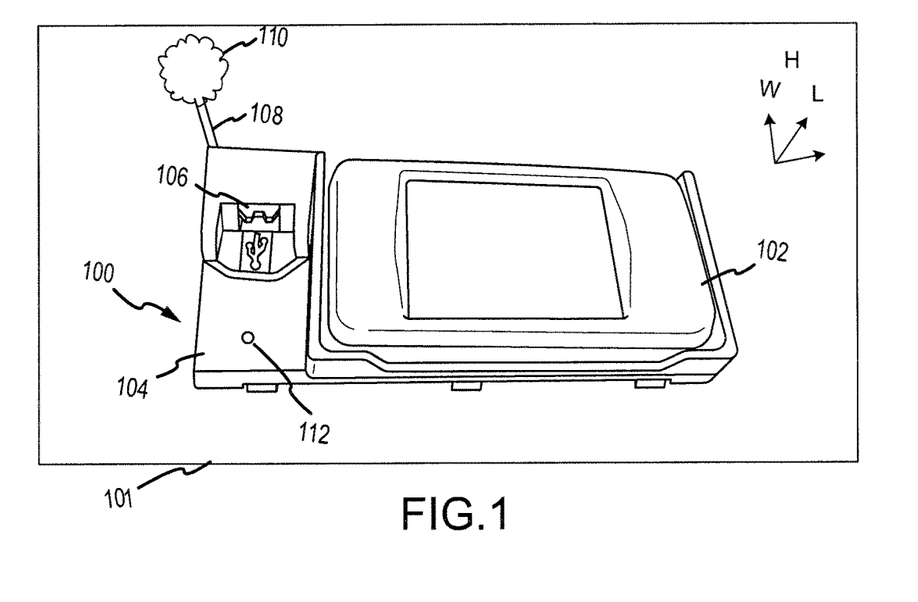

Referring to FIG. 1, a seat control unit (SCU) 100 for use in an aircraft 101 can include a control device 102 and a base 104. An L-W-H axis is shown throughout the drawings to indicate a length direction (L), a width direction (W) and a height direction (H) of components of the SCU 100.

The control device 102 can be wirelessly coupled to, and used to control, one or more systems associated with the aircraft 101. The control device 102 can be used to control various features of the aircraft 101 including audio and video settings of an entertainment system, heating and ventilation systems, lights, and actuators usable to control a position of a seat of the aircraft, for example.

The base 104 may be coupled to a power supply 110 via a cable 108. The base 104 can also include a universal serial bus (USB) port 106 that can receive power from the power supply 110 and output at least some of the power via a cable or wire. In that regard, a passenger can charge a personal device by coupling the personal device to the USB port 106 using a cable.

In various embodiments, the base 104 can wirelessly provide power to the control device 102. This wireless power transfer may occur in one of a variety of ways. For example, the power transfer may be inductive (such that a coil of the base 104 and a coil of the control device 102 function together as a transformer in response to being in proximity), may be thermal (such that heat energy is transferred from the base 104 to the control device 102), may be photoelectric or photovoltaic (such as directing light being directed from the base 104 to the control device 102) or the like.

The base 104 can also include a light 112. The light 112 may indicate the status of the SCU 100, such as whether the control device 102 is receiving power from the base 104. For example, in response to the control device 102 receiving power from the base 104, the light 112 may illuminate. The illumination of the light 112 may also assist the user in finding the base 104 when a cabin of the aircraft 101 is dark. In various embodiments, the control device 102 can also have a light to indicate the charging status and/or to assist a user in locating the control device 102.

Figure 2:
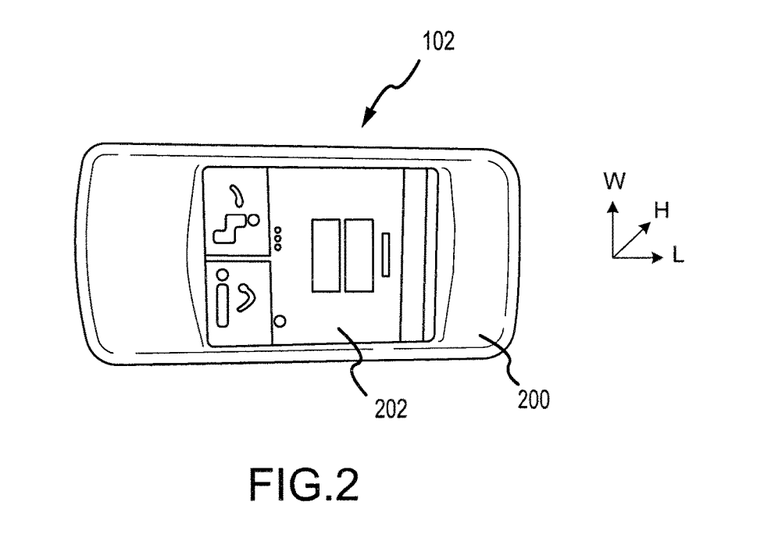
FIG. 2 is drawing of a remote controller of the seat control unit of FIG. 1, in accordance with various embodiments.

Referring now to FIG. 2, the control device 102 can include a remote controller 202 and an outer casing 200. In various embodiments, the remote controller 202 may be a combined input and output device, such as a touchscreen. In various embodiments, the control device 102 can include additional or alternative input devices and/or additional or alternative output devices. The control device 102 can also include an outer casing 200 for protecting internal components of the control device 102 and for increasing the aesthetic appeal of the control device 102.

Figure 3:
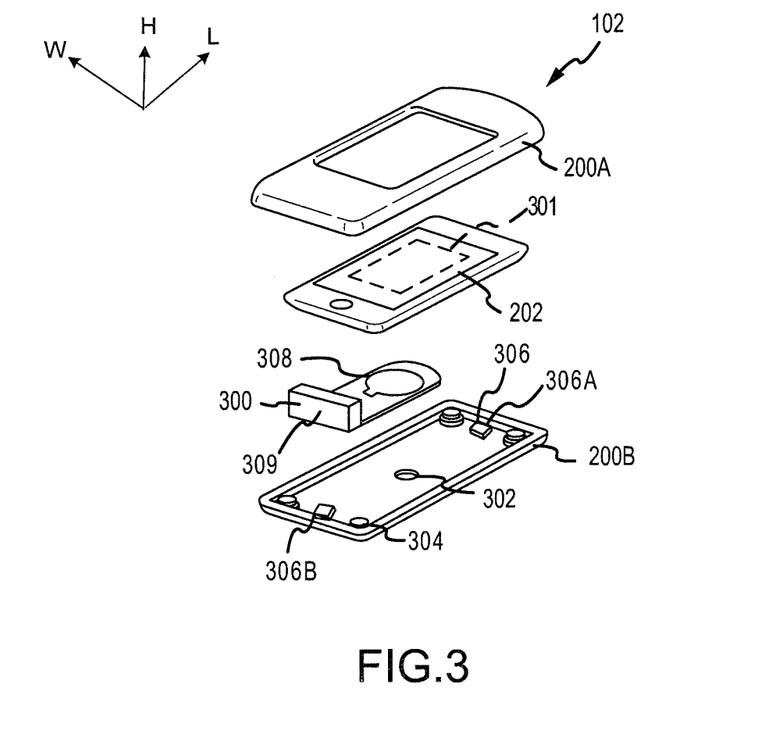
FIG. 3 is an exploded view of the remote controller of FIG. 2, in accordance with various embodiments.

More particularly and referring to FIG. 3, the control device 102 can include a top casing 200A, a bottom casing 200B, the remote controller 202 and a wireless receiver 300.

The remote controller 202 may include any electronic device capable of transmitting a control signal to another device, for example, via an 802.11a/b/g/n/ac signal (e.g., Wi-Fi), a wireless communications protocol using short wavelength UHF radio waves and defined at least in part by IEEE 802.15.1 (e.g., the BLUETOOTH protocol maintained by Bluetooth Special Interest Group), a cellular signal, an infrared signal, an optical signal, or any other signal capable of transmitting and receiving information wirelessly. In various embodiments, the remote controller 202 can include a device that is already available on the market (such as a cell phone, smart phone, tablet, personal digital assistant, laptop computer, desktop computer, and combinations of the same, for example, an iPhone™ or iPad™, available from Apple, Inc. of Cupertino, Calif.) or can include a proprietary device. In various embodiments, a personal device can be used in place of, or in addition to, the remote controller 202, and can communicate with systems of the aircraft via software.

Figure 5:
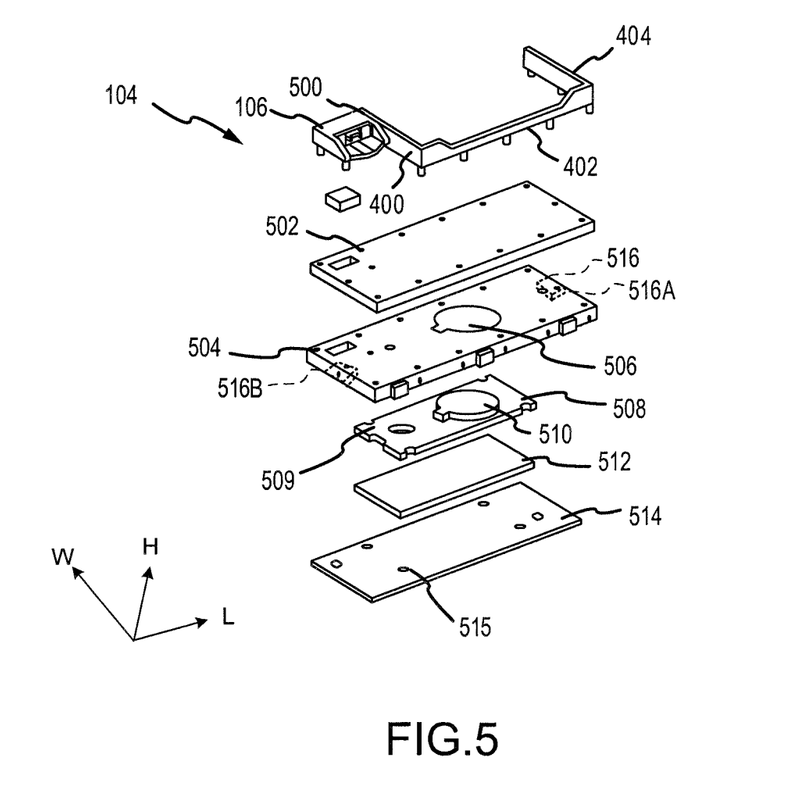
FIG. 5 is an exploded view of the base of FIG. 4, in accordance with various embodiments.

The wireless receiver 300 can include a charge receiving feature 308 that is capable of receiving a wireless power signal (such as from the charging feature 510 of FIG. 5). For example, the wireless receiver 300 can include a coil for receiving power inductively, as is known in the art. The wireless receiver 300 can also include receiving circuitry 309 operatively coupled to the charge receiving feature 308. The receiving circuitry 309 can convert a power signal received by the charge receiving feature 308 into a power signal usable by the remote controller 202. Thus, the wireless receiver 300 can receive the wireless power signal, the receiving circuitry 309 can convert the power and transfer it to the remote controller 202.

The remote controller 202 can include a battery 301 for storing electrical energy and providing electrical power to the remote controller 202. In various embodiments, the battery 301 may be packaged together with the remote controller 202 or may be separated from the remote controller 202. In response to the remote controller 202 receiving power from the receiving circuitry 309, it can be transferred to, and stored by, the battery 301 as energy.

When the remote controller is operating, it can receive and use power from the battery 301.

The top casing 200A can protect the remote controller 202 and the wireless receiver 300 from forces exerted on the control device 102 from the negative H direction. The top casing 200A can include any material. For example, the top casing 200A can include a plastic, a composite material, a metal, a natural material such as leather, or the like. It is desirable to prevent interference of a wireless power signal by any casings or other components of the SCU. However, because the top casing 200A is not designed to be positioned between the wireless receiver 300 and the wireless charger 508 of FIG. 5, the material of the top casing 200A will not significantly interfere with the wireless power signal. Thus, the top casing 200A can include a metal without significant detriment.

The bottom casing 200B can protect the remote controller 202 and the wireless receiver 300 from forces exerted on the control device 102 from the positive H direction. Furthermore, the bottom casing 200B can include one or more coupling members 304 that are designed to interface with coupling members of the top casing 200A. In response to being coupled together, the bottom casing 200B and the top casing 200A define a volume for receiving the remote controller 202 and the wireless receiver 300 and can at least partially seal the remote controller 202 and the wireless receiver 300 from external debris.

The bottom casing 200B can also include an opening 302. The opening 302 can have any size and/or shape and can allow a wireless signal to more easily propagate between the wireless receiver 300 and the wireless charger 508 of FIG. 5. Stated differently, the opening 302 reduces any interference with a wireless signal between the wireless receiver 300 and the wireless charger 508 of FIG. 5.

The bottom casing 200B can also include remote magnets 306 including a first remote magnet 306A and a second remote magnet 306B. With brief reference to FIGS. 3 and 5, the remote magnets 306 can generate a magnetic field that interacts with base magnets 516 of the base 104. The remote magnets 306 and the base magnets 516 can be oriented so as to create an attractive force therebetween. This attractive force can cause the control device 102 to resist movement relative to the base 104 when the control device 102 is operatively coupled to the base 104.

The bottom casing 200B can include any material, such as a plastic, a composite material, a metal, a natural material such as leather, or the like. As described above, it is desirable to prevent interference of a wireless power signal by any casing or other components. Because the bottom casing 200B will be positioned between the wireless receiver 300 and the wireless charger 508 during charging, it is desirable for the material to be non-metallic. Furthermore, it is desirable for a thickness of the bottom casing 200B to be relatively thin, such as between 0.01 inches (0.254 millimeters (mm)) and 0.2 inches (5.08 mm) as a thin material will cause less interference than a thicker material.

Figure 4:
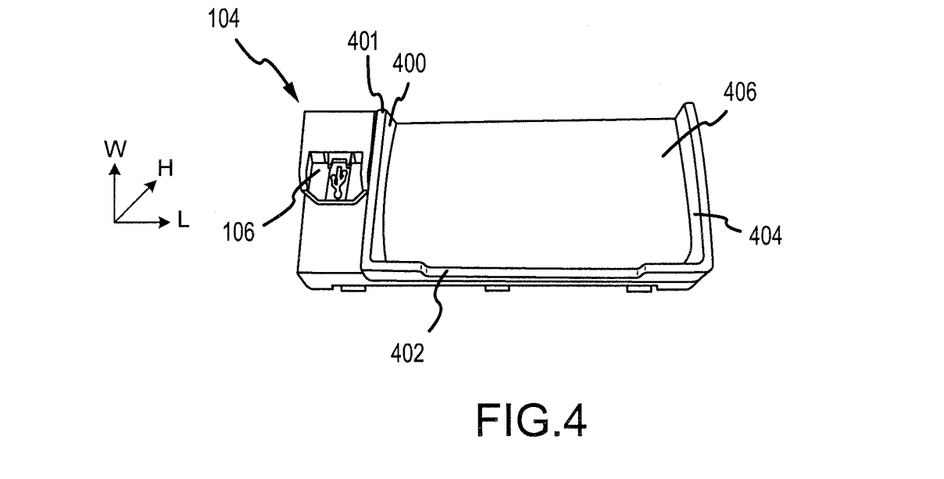
FIG. 4 is a drawing of a base of the seat control unit of FIG. 1, in accordance with various embodiments.

Referring now to FIG. 4, the base 104 can include the USB port 106, as described above, along with a plurality of walls 401 including a first wall 400, a second wall 402 and a third wall 404. The walls 401 can define an area or a cavity 406. The base 104 has been designed to be positioned adjacent a surface of the aircraft 101 of FIG. 1 such that the cavity 406 is further defined by the surface on the positive W end of the base 104. In various embodiments, a fourth wall can be included for a base that is to be used in an area without a surface further defining the cavity 406. With brief reference to FIGS. 1 and 4, the cavity 406 may have dimensions slightly larger than dimensions of the control device 102. In that regard, the cavity 406 can receive the control device 102 and restrict movement of the control device 102 relative to the base 104 in the L and W directions. For example, the control device 102 may be able to move half of an inch or less relative to the base 104 in the L and W directions. In various embodiments, additional or alternative features may be used to restrict movement of the control device 102 relative to the base. Also, as mentioned above, the remote magnets 306 and the base magnets 516 can create a force attracting the remote device 102 to the base 104 along the H axis.

Turning to FIG. 5, the base 104 can include a trim or a retaining structure 500, a top cover 502, a case 504, the wireless charger 508, padding 512 and a back cover 514.

Referring now to FIGS. 1, 3 and 5, the wireless charger 508 can be adapted to communicate with the wireless receiver 300. For example, the wireless charger 508 can include a charging feature 510 that is adapted to transmit a wireless power signal that can be received by the charge receiving feature 308. The wireless charger 508 can include transmitting circuitry 509 operatively coupled to the charging feature 510 and to the power supply 110. In that regard, the transmitting circuitry 509 can receive power from the power supply 110 and can convert the received power into a power signal usable by the charging feature 510. The charging feature 510 may then generate and/or transmit the wireless power signal to the charge receiving feature 308, from where it can be received by the receiving circuitry 309. The receiving circuitry 309 can convert this power signal into a power signal usable by the remote controller 202 and then transmit the usable power signal to the remote controller 202.

The back cover 514 can include coupling features 515 that can be used to couple the back cover 514 to a portion of the aircraft 101, such as an armrest or a seat back. In some embodiments, the back cover 514 may not exist and the case 504 can be directly coupled to the portion of the aircraft 101. The back cover 514 can protect the wireless charger 508 from any force being exerted on the base from the negative H direction. The back cover 514 can include any material. For example, the back cover 514 can include a plastic, a composite material, a metal, a natural material such as leather, or the like. It is desirable to prevent interference of a wireless power signal by any casing or other component. However, because the back cover 514 is not designed to be positioned between the wireless receiver 300 and the wireless charger 508 during charging, the material of the back cover 514 will not significantly interfere with the wireless power signal. Thus, the back cover 514 can include a metal without significant detriment to performance of the SCU 100.

The case 504 can include additional coupling features usable to connect the case 504 to the back cover 514. In response to the case 504 being coupled to the back cover 514, the wireless charger 508 may be positioned within a volume defined by the case 504 and the back cover 514. The case 504 can protect the wireless charger 508 from any force being exerted on the base 104 from the positive H direction. Furthermore, in response to being coupled together, the case 504 and the back cover 514 can at least partially seal the wireless charger from external debris.

The case 504 can include base magnets 516 including a first base magnet 516A and a second base magnet 516B. In response to the control device 102 being positioned near the base 104, the remote magnets 306 of the control device 102 can be attracted to the base magnets 516 of the base 104.

This attraction force can cause the control device 102 to resist movement relative to the base 104 in the H direction. The attraction force can also cause the control device 102 to be properly aligned with the base 104 such that the wireless receiver 300 can be aligned with, and receive charge from, the wireless charger 508. Thus, the remote magnets 306 and the base magnets 516 function to retain the control device 102 in a mated position with the base 104.

In various embodiments, the case 504 can define a recess 506 that is meant to align with the charging feature 510 of the wireless charger 508. The recess 506 can be open on the negative H side of the case 504 and can have a thickness in the H direction that is less than a thickness of other portions of the case 504 in the H direction. The recess 506 is meant to align with the charging feature 510 and, due to the reduced thickness, can reduce an amount of signal interference by the case 504. In various embodiments, the recess 506 may also provide a volume in which the charging feature 510 can be positioned when the base 104 is assembled.

The case 504 can include any material, such as a plastic, a composite material, a metal, a natural material such as leather, or the like. As described above, it is desirable to prevent interference of the wireless power signal by any casings. Because the case 504 will be positioned between the wireless receiver 300 and the wireless charger 508 during charging, it is desirable for the material of the case 504 to be non-metallic. Furthermore, it is desirable for a thickness of the bottom casing 200B (at least the thickness of the recess 506) to be relatively thin, such as between 0.01 inches (0.254 millimeters (mm)) and 0.2 inches (5.08 mm) as a thin material will cause less interference than a thicker material.

The optional padding 512 is positioned between the back cover 514 and the case 504. In response to the case 504 being coupled to the back cover 514, the padding 512 is compressed and exerts a force in the positive H direction onto the wireless charger 508. This force can reduce the likelihood of the wireless charger 508 moving relative to the case 504 and the back cover 514 in all directions. This force can also increase the likelihood that the wireless charger 508 will be positioned as close as possible to the control device 102 in the H direction in response to the control device 102 being coupled to the base 104.

In various embodiments, the padding 512 can be replaced by one or more springs configured to compress in the H direction in response to the case 504 being coupled to the back cover 514. In various embodiments, the padding 512 may not exist and the wireless charger 508 may fit snugly between the case 504 and the back cover 514 such that the wireless charger 508 resists movement relative to the case 504 and the back cover 514 due to the snug fit. In various embodiments, the wireless charger 508 may be directly coupled to the case 504 and/or the back cover 514 such as via a fastener, glue or the like.

The optional top cover 502 may increase the aesthetics of the base 104. The top cover 502 can include any material, such as a plastic, a composite material, a metal, a natural material such as leather, or the like. As described above, it is desirable to prevent interference of the wireless power signal by any casings. Because the top cover 502 will be positioned between the wireless receiver 300 and the wireless charger 508, it is desirable for the material of the top cover 502 to be non-metallic. Furthermore, it is desirable for a thickness of the top cover 502 to be relatively thin, such as between 0.01 inches (0.254 millimeters (mm)) and 0.2 inches (5.08 mm) as a thin material will cause less interference than a thicker material. In various embodiments, it is desirable for the top cover 502 to have a distance in the H direction that is sufficient to reduce observable wear to the top cover 502 while still reducing the amount of interference with the wireless power signal. In various embodiments, the top cover 502 can include leather. Leather is visually appealing and can also provide friction with the control device 102, further resisting movement of the control device 102 relative to the base.

The top cover 502 can be coupled to the case 504 and/or to the back cover 514 in any fashion. For example, fasteners may be used to couple the top cover 502 to the case 504. The top cover 502 may instead snugly fit about the case 504 such that friction between the top cover 502 and the case 504 reduce the likelihood of the top cover 502 becoming removed from the case 504.

The retaining structure 500 can include the first wall 400, the second wall 402 and the third wall 404. The retaining structure 500 may be coupled to any of the top cover 502, the case 504, the back cover 514 and/or directly to the surface of the aircraft 101. The retaining structure 500 can include any material such as a plastic, a composite material, a metal, a natural material such as leather, or the like. In various embodiments, the retaining structure 500 may be composed of plastic and a chrome plating on the plastic to improve the aesthetic appeal of the base 104.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A seat control unit for use in an aircraft, comprising:
a base having:
   a wireless charger configured to transmit a wireless power signal,
   a case at least partially enclosing the wireless charger,
   a back cover configured to be coupled to the aircraft and to the case such that the wireless charger is configured to be positioned within a volume defined by the back cover and the case, and
   a compressive element coupled between the wireless charger and the back cover and configured to compress in response to the back cover being coupled to the case in order to exert a force onto the wireless charger to resist movement of the wireless charger relative to the back cover; and
a control device having:
   a remote controller configured to wirelessly control a system of the aircraft,
   an energy storage device coupled to the remote controller and configured to store electrical energy,
   a wireless receiver configured to receive the wireless power signal from the wireless charger and transmit associated power to the energy storage device, and
   an outer casing at least partially enclosing at least one of the remote controller or the wireless receiver.

2. The seat control unit of claim 1, wherein the compressive element includes padding.

3. The seat control unit of claim 1, wherein the base further includes a top cover coupled to the case for increasing aesthetic appeal of the base.

4. The seat control unit of claim 1, wherein the base further includes a retaining structure configured to resist movement of the control device relative to the base.

5. The seat control unit of claim 1, wherein the wireless charger further includes a charging feature configured to transmit the wireless power signal and the case further defines a recess that aligns with the charging feature when the base is assembled.

6. The seat control unit of claim 1, wherein the base further includes a first base magnet and the control device further includes a first remote magnet, the first base magnet and the first remote magnet being configured to attract to each other to resist movement of the control device relative to the base.

7. The seat control unit of claim 1, wherein the outer casing of the control device includes a top casing and a bottom casing coupled together.

8. The seat control unit of claim 7, wherein the bottom casing defines an opening configured to reduce the likelihood of interference of the wireless power signal when the control device is operatively coupled to the base.

9. A base for use in an aircraft, comprising:
a wireless charger configured to transmit a wireless power signal;
a back cover configured to be coupled to the aircraft;
a case configured to be coupled to the back cover such that the back cover and the case define an opening in which the wireless charger is configured to be positioned; and
a compressive element coupled between the wireless charger and the back cover and configured to compress in response to the back cover being coupled to the case in order to exert a force onto the wireless charger to resist movement of the wireless charger relative to the back cover.

10. The base of claim 9, wherein the compressive element includes padding.

11. The base of claim 9, further comprising a top cover coupled to the case for increasing aesthetic appeal of the base.

12. The base of claim 9, wherein the base is part of a seat control unit and wherein the seat control unit also includes a control device configured to wirelessly control a system of the aircraft.

13. The base of claim 12, wherein the base is configured to mate with the control device and the wireless charger is configured to transmit the wireless power signal to the control device in response to the base being mated with the control device.

14. The base of claim 12, further comprising a retaining structure configured to resist movement of the control device relative to the base.

15. The base of claim 9, wherein the wireless power signal can be received by a personal device for powering the personal device.

16. A seat control unit for use with an aircraft, comprising:
a control device having:
   a remote controller configured to wirelessly control a system of the aircraft,
   an energy storage device coupled to the remote controller and configured to store electrical energy,
   a wireless receiver configured to receive a wireless power signal and transmit associated power to the energy storage device, and
   an outer casing at least partially enclosing the remote controller and the wireless receiver; and
a base having:
   a wireless charger configured to transmit the wireless power signal,
   a case at least partially enclosing the wireless charger,
   a back cover configured to be coupled to the aircraft and to the case such that the wireless charger is configured to be positioned between the back cover and the case, and
   a compressive element coupled between the wireless charger and the back cover and configured to compress in response to the back cover being coupled to the case in order to exert a force onto the wireless charger to resist movement of the wireless charger relative to the back cover.

17. The seat control unit of claim 16, wherein the outer casing includes a top casing and a bottom casing coupled together and defining a volume in which the remote controller and the wireless receiver are positioned.

18. The seat control unit of claim 17, wherein:
the control device further includes a first remote magnet coupled to the bottom casing;

the base further includes a first base magnet;
the control device is configured to mate with and receive the wireless power signal from the base; and
the first remote magnet and the first base magnet attract to reduce the likelihood of the control device separating from the base in response to the control device being mated with the base.

19. The seat control unit of claim 18, wherein the bottom casing defines an opening configured to reduce the likelihood of interference of the wireless power signal when the control device is operatively coupled to the base.

* * * * *